PRESSURE RECORDING INSTRUMENT.
APPLICATION FILED JUNE 10, 1913.
1,098,932.  Patented June 2, 1914.
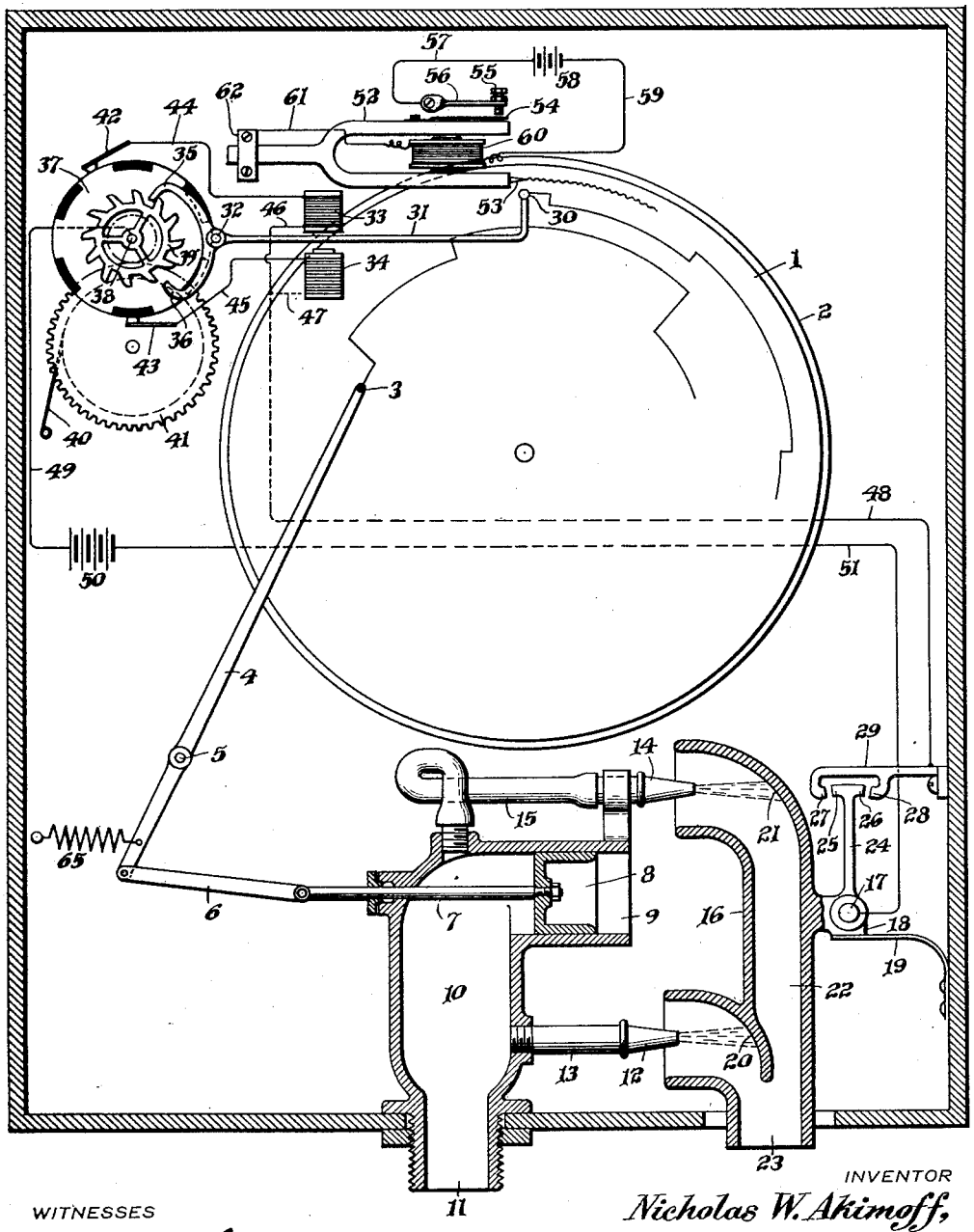
WITNESSES
Daniel Webster, Jr.
William S. Atchison
INVENTOR
Nicholas W. Akimoff,
By Jas. C. Wolvensmith
ATTORNEY

NICHOLAS W. AKIMOFF, OF PHILADELPHIA, PENNSYLVANIA.

PRESSURE-RECORDING INSTRUMENT.

1,098,932.  Specification of Letters Patent.  Patented June 2, 1914.

Application filed June 10, 1913. Serial No. 772,733.

*To all whom it may concern:*

Be it known that I, NICHOLAS W. AKIMOFF, a subject of the Czar of Russia, residing in Philadelphia, in the county of Philadelphia and State of Pennsylvania, have invented certain new and useful Improvements in Pressure-Recording Instruments, of which the following is a specification.

My invention relates to pressure recording instruments and it has particular relation to apparatus for automatically making a record of instantaneous variations in pressure in water mains and other hydraulic apparatus.

The object of my invention is to provide a simple and efficient apparatus for recording and registering rapid variations in pressure in which the extent of the variations will be accurately registered, in which a separate record of the time of occurrence of the variations will be simultaneously made, and in which the time element will be accurately indicated during the making of the record notwithstanding variations in the speed of movement of the chart.

The nature and characteristic features of my invention will be more readily understood from the following description taken in connection with the accompanying drawing forming part hereof, which shows an elevational view, to a certain extent diagrammatic, of an apparatus embodying the main features of my present invention.

Referring to the drawing in the particular embodiment of my invention therein shown, 1 is a flat circular chart of the well known type which is mounted upon a suitable disk 2 and rotated about its center by clockwork, not shown, but in the manner well known and understood by those making and using instruments of this general character. Any of the other well known types of movable chart may be substituted for the flat circular chart shown without departing from the spirit of my invention.

3 is a pen or other suitable marking device adapted to trace a record upon the chart 1, which pen is mounted on the end of a lever arm 4, which lever arm is pivoted as at 5 to a stationary part of the structure. A connecting rod 6 is pivoted to the lever arm 4 at a suitable point and extends to a pivotal connection with one end of a piston rod 7 which carries a piston 8 at its other end.

A spring 65 connected at one end to the lever 4 and at its other end to a stationary portion of the structure normally tends to move the piston inwardly within its cylinder 9. The piston 8 is mounted to be freely movable in the cylinder 9 which extends from the upper end of the chamber 10, this chamber being adapted to be hydraulically connected by means of a threaded nipple 11 to the water main or other hydraulic apparatus, the phenomena of which it is desired to investigate.

A nozzle 12 is connected with the chamber 10 by means of a pipe 13 so as to form a jet which is projected outwardly with a force varying in a degree corresponding to the pressure within the chamber 10. 14 is a similar nozzle suitably supported and connected with the chamber 10 preferably by means of a flexible hose 15 for a purpose to be hereinafter more fully set forth. The nozzle 14 is also adapted to project a water jet in a manner similar to that of the nozzle 12. Arranged in front of the nozzles 12 and 14 is a device 16 which is pivoted as at 17 to a stationary part of the structure, this device 16 being adapted to have a limited range of oscillation about the pivot 17. Adjacent the pivot 17 the member 16 is provided with a lug 18 having a flat underside against which a spring 19 is adapted to bear to normally maintain the device 16 at rest in a normal central position. The spring 19 is of just sufficient strength to eliminate vibration but not of sufficient strength to interfere with the proper operation of said member 16.

As before stated the device 16 is mounted in front of the nozzles 12 and 14 and is provided with curved bearing surfaces 20 and 21 respectively against which the water jets above referred to are adapted to impact. These surfaces 20 and 21 are respectively located at substantially uniform distances above and below the location of the pivot 17, the arrangement being such that the jets normally balance each other and maintain the device 16 in its central position as shown in the drawing. A conduit 22 extends downwardly from the surface 21 and merges into a common conduit 23 for the discharge of the water emerging from the nozzles 12 and 14.

The pivoted member 16 is provided with an extending arm 24 which is provided at its free end with contact lugs 25 and 26 which are adapted respectively to contact with lugs 27 and 28 of a bracket 29, which is mounted upon any suitable portion of the stationary casing or housing, accordingly as the member 16 may be rocked on its pivot by momentary inequalities of the impact of the jets projected from the nozzles 12 and 14 respectively.

A marking pen 30 is mounted upon the end of a rocker arm 31 pivoted as at 32 to a stationary part of the structure, the arm 31 constituting an armature adapted to be attracted by one or the other of the electro-magnets 33 and 34. Integral with the rocker arm 31 are the escapement pawls 35 and 36 which control the movement of a commutator 37 mounted upon a shaft 38 upon which is also mounted the escapement wheel 39 with which the pawls 35 and 36 co-act. The commutator normally tends to rotate on its axis under the tension of a clock spring 40 operating through a gear 41 upon a suitable gear mounted upon the commutator shaft 38. The periphery of the commutator is divided into live and insulated sectors of equal extent and in number corresponding to the number of teeth in the escapement wheel 39. Bearing against the periphery of the commutator 37 are contact brushes 42 and 43, so located that one of said brushes bears against a live segment of the commutator while the other of said brushes bears against an insulated segment thereof, this condition being alternately altered with each step by step movement of the commutator under the control of the escapement mechanism above described. The brush 42 is electrically connected to the magnet 33 by means of a wire 44, and the brush 43 is likewise electrically connected with the magnet 44 by means of a wire 45. After passing through the windings of the magnet 33 the circuit passes through a wire 46 and likewise the circuit passing through the magnet 34 extends through a wire 47 which wires 46 and 47 are joined in a common return line 48 which extends to the bracket 29 hereinbefore described. The wire 49 is grounded on the live part of the commutator 37 and extends to a battery 50 or other suitable source of electrical energy, and the circuit thence extends by means of wire 51 to a connection with the rocking device 16.

It should be understood that the apparatus of my present invention is designed for sensitive and accurate work in connection with the investigation of certain phenomena in water mains and other hydraulic apparatus, and for this work it is essential that some check be had on the speed of rotation of the chart as otherwise considerable inaccuracy in the result might occur on account of variations in the speed of the clockwork or other means for actuating the chart. For this purpose a tuning fork 52 may be employed, having a pen or other suitable marking device 53 mounted upon one tine of the fork, which pen is adapted to trace a wave line upon the chart simultaneously with the marking the pressure record. The fork 52 may be kept in vibration by means of an electro-magnet 60 mounted between the tines of the fork and a contact member 54 may be carried on the end of one of said tines which is adapted to make and break with a screw 55 suitably supported by a bracket 56 from any preferred part of the stationary frame work or housing of the apparatus. The bracket 56 which supports the screw 55 is electrically connected by means of a wire 57 to a battery 58 or other source of electrical energy, the circuit thence passing by wire 59 to the magnet 60, thence by wire 61 to the bracket 62 supporting the fork 52, and finally completing the circuit through the fork to the contact member 54.

The operation of the apparatus will now be readily understood. As before stated the chamber 10 is hydraulically connected with the water main or other apparatus under investigation, and the piston 8, its rod 7 connecting rod 6, pivoted arm 4 and marking device 3 will serve to register the variations in pressure occurring in said water main or other apparatus. If however, this mechanism was used alone, the time at which sudden but slight variations in pressure occur might not be sufficiently accurately indicated. When such a variation occurs the shock thereby happening will first affect the jet emanating from the nozzle 12 which is in direct communication with the chamber 10 by means of the pipe 13, and the shock will be delayed in its transmission and effect on the jet emanating from the nozzle 14 on account of the flexible hose connection 15 and consequently an inequality of pressure on the respective impact surfaces 20 and 21 will result, causing the device 16 to rock on its axis and thereby causing one or the other of the contact lugs 25 or 26 to establish the circuit through the bracket 29 and the connection wires extending to the electro-magnets 33 and 34. Accordingly as the particular brush 42 or 43, as the case may be, is resting on a live segment of the commutator the magnet controlled thereby will be energized momentarily and the pen 30 will be thus changed in its position with each successive variation in pressure occurring in the chamber 10, the pen being moved back and forth first by the one magnet and then by the other, the pawls and escapement wheel meanwhile permitting the commutator to rotate step by step to thus cause the magnets 33 and 34 to be alternately energized.

Having thus described the nature and characteristic features of my invention, what I claim as new and desire to secure by Letters Patent is:—

1. A pressure recording instrument comber, means for marking a record on said chart controlled by the pressure of fluid in said chamber, a jet nozzle in direct communication with said chamber, another jet nozzle connected with said chamber in such manner that variations in pressure will be delayed in transmission to said nozzle, and means controlled by inequalities in the jets emanating from said nozzles for marking a separate record of the time of occurrence of variations of pressure in said chamber.

2. A pressure recording instrument comprising a movable chart, a pressure chamber, means for marking a record on said chart controlled by the pressure of fluid in said chamber, a jet nozzle in direct communication with said chamber, another jet nozzle having a flexible conduit communicating with said chamber, and means controlled by inequalities in the jets emanating from said nozzles for marking a separate record of the time of variations of pressure in said chamber.

3. A pressure recording instrument comprising a movable chart, a pressure chamber, means for marking a record on said chart controlled by the pressure of fluid in said chamber, a jet nozzle in direct communication with said chamber, another jet nozzle having a flexible conduit communicating with said chamber, a rocking member arranged in front of said nozzles and adapted to be actuated by inequalities in the jets emanating therefrom, and means controlled by said rocking member for marking a separate record on said chart.

4. A pressure recording instrument comprising a movable chart, a pressure chamber, means for marking a record on said chart controlled by the pressure of fluid in said chamber, a jet nozzle in direct communication with said chamber, another jet nozzle having a flexible conduit communicating with said chamber, a rocking member arranged in front of said nozzles and adapted to be actuated by inequalities in the jets emanating therefrom, means controlled by said rocking member for marking a separate record on said chart, and electrically actuated means controlled by said rocking member for marking a separate record on said chart.

5. In a pressure recording instrument, a movable chart, a pressure chamber, and means for marking a record on said chart of the time of occurrence of variations of pressure in said chamber comprising a marking pen, a pair of electro-magnets adapted to alternately shift said marking pen, and means for alternately energizing pressure in said chamber.

6. In a pressure recording instrument, a movable chart, a pressure chamber, and means for marking a record on said chart of the time of occurrence of variations of pressure in said chamber comprising a marking pen, a pair of electro-magnets adapted to alternately shift said marking pen, an electric circuit having branches in which said magnets are included, a commutator for alternately shunting the circuit from one to the other of said magnets, and means controlled by variations in pressure in the chamber for momentarily closing said circuit.

7. In a pressure recording instrument, a movable chart, a pressure chamber, and means for marking a record on said chart of the time of occurrence of variations of pressure in said chamber comprising a marking pen, a pair of electro-magnets adapted to alternately shift said marking pen, an electric circuit having branches in which said magnets are included, a commutator for alternately shunting the circuit from one to the other of said magnets, an escapement mechanism controlled by the shifting of the marking pen for controlling the movement of said commutator, and means for momentarily closing said circuit upon the occurrence of variations of pressure in the chamber.

8. A pressure recording instrument comprising a movable chart, a pressure chamber, means for marking a record on said chart controlled by the pressure of fluid in said chamber, a jet nozzle in direct communication with said chamber, another jet nozzle having a flexible conduit communicating with said chamber, a rocking member arranged in front of said nozzles and adapted to be actuated by inequalities in the jets emanating therefrom, a contact device controlled by said rocking member, an electric circuit controlled by said contact device, said circuit having two branches, an electromagnet arranged in each of said branches, a separate marking pen adapted to be alternately shifted by first one and then the other of said magnets, and means for automatically shunting the circuit alternately through the two branches and the magnets included therein.

In testimony whereof, I have hereunto signed my name in the presence of two witnesses.

NICHOLAS W. AKIMOFF.

Witnesses:
WILLIAM S. ATCHISON,
LILLIAN H. NEVEIL.

Copies of this patent may be obtained for five cents each, by addressing the "Commissioner of Patents, Washington, D. C."